(12) United States Patent
Stefanelli et al.

(10) Patent No.: US 10,909,827 B2
(45) Date of Patent: Feb. 2, 2021

(54) METHODS AND SYSTEMS FOR BREAK-IN DETECTION

(71) Applicant: Tsec S.p.A., Bedizzole (IT)

(72) Inventors: Fabio Stefanelli, Bedizzole (IT);
Alessio Degani, Bedizzole (IT); Ugo Bertacchini, Bedizzole (IT)

(73) Assignee: TSEC S.P.A., Bedizzole (IT)

(*) Notice: Subject to any disclaimer, the term of this patent is extended or adjusted under 35 U.S.C. 154(b) by 0 days.

(21) Appl. No.: 16/579,468

(22) Filed: Sep. 23, 2019

(65) Prior Publication Data
US 2020/0098232 A1 Mar. 26, 2020

(30) Foreign Application Priority Data
Sep. 24, 2018 (IT) .................. 102018000008844

(51) Int. Cl.
| G08B 13/24 | (2006.01) |
| G01S 13/00 | (2006.01) |
| G08B 25/10 | (2006.01) |

(52) U.S. Cl.
CPC ........ G08B 13/2491 (2013.01); G01S 13/003 (2013.01); G08B 25/10 (2013.01)

(58) Field of Classification Search
CPC ... G08B 13/2491; G08B 13/122; G08B 29/22
See application file for complete search history.

(56) References Cited

U.S. PATENT DOCUMENTS

| 4,001,771 A | * | 1/1977 | Amrine ................. G01S 11/14 367/129 |
| 2007/0008123 A1 | | 1/2007 | Swanson |

(Continued)

FOREIGN PATENT DOCUMENTS

| WO | 2009/144724 A1 | 12/2009 |
| WO | 2013/098861 A1 | 7/2013 |

OTHER PUBLICATIONS

Italian Search Report and Written Opinion dated May 27, 2019, in IT Application No. 102018000008844, 8 pages.

*Primary Examiner* — Hongmin Fan
(74) *Attorney, Agent, or Firm* — MH2 Technology Law Group, LLP

(57) ABSTRACT

A method of detecting break-ins in an intrusion-detection barrier which includes an array of sensors in signal communication with one another and connected to a control unit may include: calibrating at least one of the sensors of the array, the calibrating including: applying mechanical stress to the barrier to cause the barrier to resonate at characteristic frequencies; and creating a digital filter, for the at least one of the sensors, configured to identify the characteristic frequencies; and/or detecting external forcing applied to the barrier, the external forcing having oscillation-forcing frequencies, the detecting including: applying the filter to identify the oscillation-forcing frequencies applied to the barrier, and discriminating the oscillation-forcing frequencies from the characteristic frequencies of the barrier; selecting at least one energy threshold value; calculating an energy value for each of the oscillation-forcing frequencies; and comparing each of the energy values with the at least one energy threshold value.

20 Claims, 1 Drawing Sheet

(56) References Cited

U.S. PATENT DOCUMENTS

2011/0172954 A1* 7/2011 Berger ................ G08B 13/122
                                                                                     702/150
2012/0286161 A1* 11/2012 Raieszadeh ............... G01J 5/58
                                                                                     250/338.3
2014/0119687 A1* 5/2014 Hao ................... G02B 6/02209
                                                                                      385/12

* cited by examiner

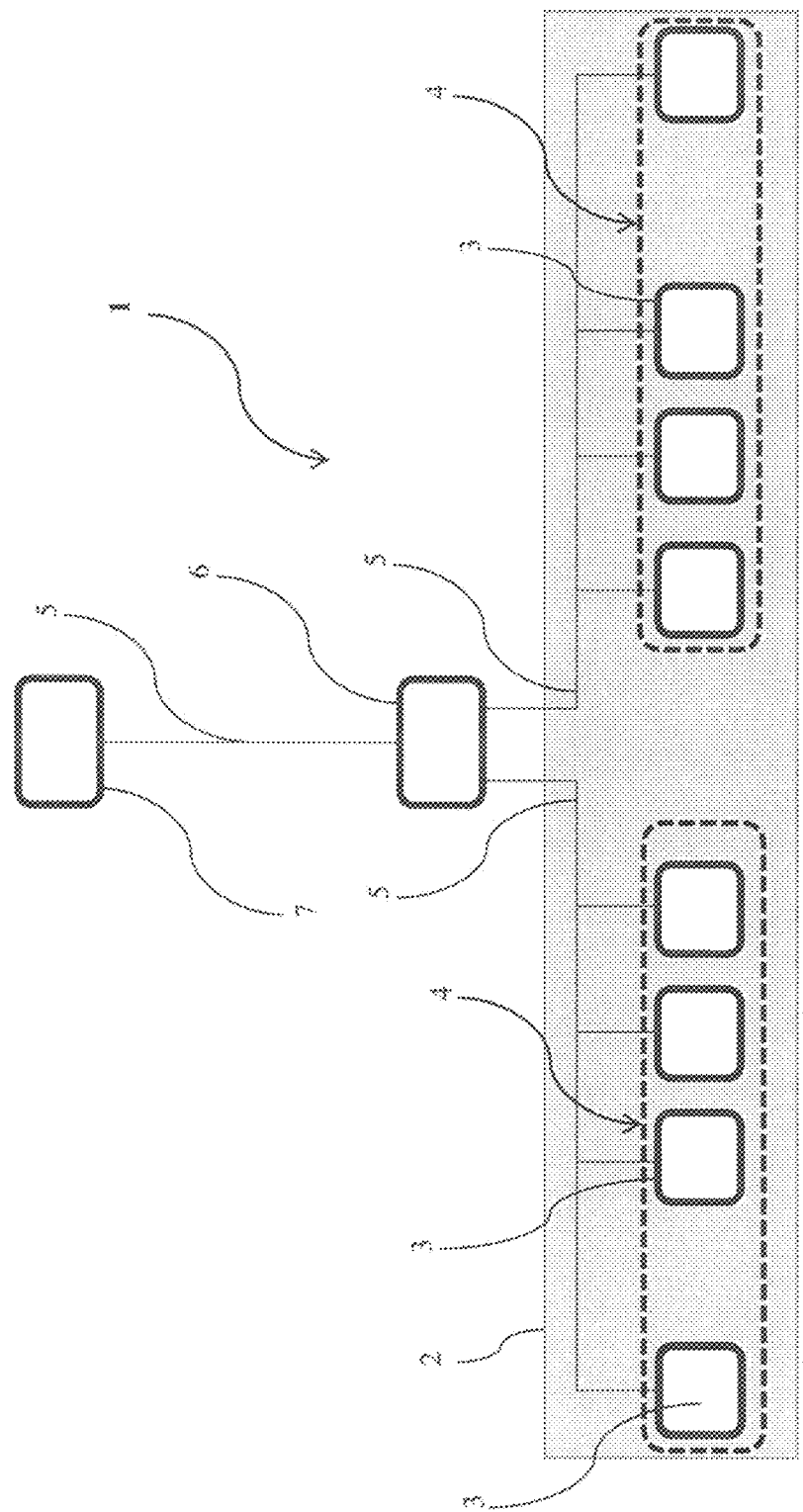

METHODS AND SYSTEMS FOR BREAK-IN DETECTION

CROSS-REFERENCE TO RELATED APPLICATION(S)

This application claims priority under 35 U.S.C. § 119 from Italian Patent Application No. 102018000008844, filed on Sep. 24, 2018, in the Italian Patent and Trademark Office ("IPTO"), the entire contents of which are incorporated herein by reference.

TECHNICAL FIELD

The present invention relates to a method and a system for detecting break-ins in intrusion-detection barriers.

BACKGROUND ART

A variety of monitoring methods based on vibration detection in intrusion-detection barriers are known in the art.

In particular, WO 2013/098861 discloses a security system that can monitor intrusion-detection barriers. This system has an array of sensors installed along the barrier in signal communication with one another and connected to a microcontroller. The sensors are constructed according to MEMS (Micro Electro-Mechanical System) technology and may be uniaxial, biaxial or triaxial. In response to a mechanical action on the intrusion-detection barrier, such sensors generate an electric signal along at least one axis thereof. The sensors are divided into modules, with each module having a peripheral analyzer consisting of a microcontroller in which the distances between each sensor of the module are stored. This peripheral analyzer is configured to sample the electric signals generated on each axis of the sensor and to assign a first break-in probability by comparison with preset threshold values. The probability is assigned according to a fuzzy or Boolean logic. The fuzzy logic uses a comparison between the signal from each sensor with about one hundred different thresholds, thereby affording time-dependent signal classification. On the other hand, the Boolean logic use a single threshold that defines the occurrence of the mechanical action. The alarm signal is triggered when the received signals for each axis of the sensors are greater than one or more thresholds, based on the logic in use, during a given time window of analysis. In particular, membership functions are identified, which relate the exceeding of the reference threshold to the time window of analysis. These membership functions are used to assign a probability to the mechanical action detected by the individual sensor. The peripheral analyzer generates an alarm signal that depends on the spatial coordinates of the sensors of the module. Therefore, a mechanical action is detected by the nearest sensor with greater intensity and by the sensors adjacent thereto with smaller intensity. This information redundancy affords correct identification of the position in which the mechanical action occurred. The alarm signal generated by the peripheral analyzer is transmitted to a central analyzer, which is configured to perform a comparison between alarm signals of adjacent modules. As a result of this comparison a second alarm signal is generated, which notifies whether two or more zones (corresponding to one or more modules) have detected the same mechanical actions on the intrusion-detection barrier.

The central analyzer sends a signal to a communication device to notify users whether the mechanical action has actually occurred on the intrusion-detection barrier.

PROBLEM OF THE PRIOR ART

While the prior art system can detect a mechanical action caused by a break-in the intrusion-detection barrier, it cannot ensure accuracy in the detection of this type of events, because the alarm might be generated even when no break-in has occurred. This is because accidental events, such as closing a gate or weather events such as rain or wind, may trigger the generation of an alarm signal. Therefore, the generation of the alarm is caused by reduced reliability of the system, and the user might receive an alarm signal even when there is no actual threat.

SUMMARY OF THE INVENTION

The object of the present invention is to provide a method of monitoring intrusion-detection barriers that can determine with high accuracy whether a mechanical action on the barrier has been caused by break-in.

A further object of the present invention is to provide a break-in detection system that can obviate the drawbacks of the prior art.

BRIEF DESCRIPTION OF THE DRAWINGS

The characteristics and advantages of the present invention will result from the following detailed description of a possible practical embodiment, illustrated as a non-limiting example in the set of drawings, in which:

FIG. 1 shows a system for detecting break-ins in intrusion-detection barriers.

DETAILED DESCRIPTION

Referring to FIG. 1, the present invention relates to a system 1 configured to detect break-ins in intrusion-detection barriers 2. The intrusion-detection barrier 2 consists of a uniform intrusion-detection barrier or, alternatively, comprises several portions, such as wire fencing of various rigidity, gates and masonry pillars.

The system 1 comprises a plurality of sensors 3. These sensors 3 are in signal communication with one another. The sensors 3 are configured to create an array 4 of sensors 3 in signal communication with one another, preferably by means of a six-wire cabling scheme 5. More preferably, the six wires comprise a power supply wire, a ground wire, two data wires for the transmission of data generated by each sensor, a daisy chain and a shield. Still preferably, each sensor 3 is identified by a specific address. In addition, each sensor 3 is configured to detect the acceleration imparted to the intrusion-detection barrier 2, when the latter is under stress. In the preferred embodiment as shown in FIG. 1, each sensor 3 relies on MEMS technology suitable for detecting the acceleration imparted to the intrusion-detection barrier 2.

The system 1 comprises a control unit 6, preferably housed in a protective casing or box, which is optionally equipped with an anti-tamper device (not shown in the FIGURE).

The system 1 comprises a network card 7 for managing data associated with the sensors 3 and communications with units external to the system. Preferably, the network card 7 comprises an Ethernet port adapted for configuration of the operating parameters of the system 1.

In the preferred embodiment of FIG. 1, each sensor is configured to be mounted to the intrusion-detection barrier 2. The sensors 3 are in signal communication with the control unit 6. The control unit 6 acts as a master of the system, and the sensors 3 act as slaves. The control unit 6 is configured to coordinate communications of the sensors 3 of each array 4, and to transmit the signals from each sensor 3 to the network card 7. Such control unit 6 is configured to support up to two arrays 4 of sensors 3. In particular, each array 4 is composed of up to one hundred and twenty sensors 3 which can cover up to one thousand two hundred meters of an intrusion-detection barrier 2. Preferably, the control unit 6 is connected to the network card 7 via a universal asynchronous receiver-transmitter (not shown in the FIGURE).

In a preferred arrangement of the invention, the network card 7 provides power supply to the control unit 6 and the sensors 3. Preferably, the network card 7 is configured to report alarms to stations external to the system 1 and, more preferably, to allow configuration of the system 1 via a web management interface.

The present invention also relates to a method of detecting break-ins in the intrusion-detection barrier 2. In particular, it shall be noted that each sensor 3 is configured to generate an alarm according to a method of detecting break-ins in the intrusion-detection barrier 2. This method comprises three main steps that are carried out by at least one sensor. Preferably, especially in case of non-uniform barriers, each step is carried out using each sensor 3 individually and independently of the other sensors of the array 4 of sensors 3.

The method of detecting break-ins in the intrusion-detection barrier 2 comprises a first step of calibrating at least one sensor 3.

This step comprises the sub-step of applying mechanical stress to the intrusion-detection barrier 2. The sub-step of applying mechanical stress to the intrusion-detection barrier 2 is designed to cause the intrusion-detection barrier 2 to resonate at its characteristic frequencies. This stress generates accelerations that are detected by the sensors 3.

The step of calibrating at least one sensor 3 comprises the sub-step of creating a digital filter for the sensor 3. This means that each sensor 3, independently of the other sensors of the array 4 of sensors 3, processes the characteristic frequencies in the intrusion-detection barrier 2 to implement a filter that allows identification of these characteristic frequencies each time the sensor 3 detects an acceleration.

According to a preferred embodiment of the invention, the sub-step of applying mechanical stress to the intrusion-detection barrier 2 comprises a further sub-step of applying stress to the intrusion-detection barrier 2 in the vicinity of the at least one sensor 3. This sub-step includes exerting a mechanical action to the intrusion-detection barrier 2 in the vicinity of the sensor 3. This mechanical action simulates harmless vibrations caused by inadvertent actions, e.g. accidental impacts or weather agents. Preferably, the mechanical action may be imparted by a user or using a testing tool that can generate controlled mechanical actions.

For example, the mechanical action may be imparted by the user with his/her hand and/or using a metal object. In particular, an action imparted with a hand generates low-frequency oscillations, and an action imparted with a metal object generates high-frequency oscillations. The system 1 as disclosed herein may require both low-frequency and high-frequency stress. Preferably, the sub-step of applying mechanical stress to the barrier comprises an additional sub-step of generating the electric signal by each sensor 3, in which the electrical signal is proportional to the acceleration imparted by the mechanical action as described in the previous sub-step.

According to a preferred embodiment of the invention, the sub-step of creating a digital filter for each sensor 3 configured to identify said characteristic frequencies comprises an additional sub-step of computing the Fast Fourier Transform of the electric signal generated in the previous sub-step to identify the characteristic frequencies of the intrusion-detection barrier 2 that resonated by the action of the user. In other words, the electric signal proportional to the acceleration is sampled by the sensor 3 to perform a frequency analysis using a Fast Fourier Transform and identify the characteristic frequencies of the intrusion-detection barrier 2 in an efficient manner and with a low computational cost.

Preferably, the sub-step of creating a digital filter for each sensor 3 comprises the additional sub-step of selecting the characteristic frequencies of said intrusion-detection barrier 2 and classifying it as rigid or semi-rigid fencing according to the selected characteristic frequencies.

The method of detecting break-ins in the intrusion-detection barrier 2 comprises a second step of detecting an external forcing applied to the intrusion-detection barrier 2. Such external forcing is characterized by forcing frequencies.

This step of detecting an external forcing applied in the intrusion-detection barrier 2 comprises the sub-step of generating the electric signal by each sensor 3, in which the electrical signal is proportional to the acceleration imparted to the intrusion-detection barrier 2 by the external forcing.

Preferably, the step of detecting an external forcing applied to the intrusion-detection barrier 2 comprises the sub-step of computing the Fast Fourier Transform of the electric signal generated in the previous sub-step as described above to identify the forcing frequencies applied to the intrusion-detection barrier 2.

The step of detecting an external forcing applied to the intrusion-detection barrier 2 comprises the sub-step of applying the filter created in the above described step. This filter discriminates the forcing frequencies applied to the intrusion-detection barrier 2 from the characteristic frequencies detected during the step of calibrating each sensor 3.

The step of detecting an external forcing applied to the intrusion-detection barrier 2 comprises the sub-step of selecting at least one energy threshold value. Preferably, the energy threshold value comprises a high frequency value and a low-frequency value.

The step of detecting an external forcing applied to the intrusion-detection barrier 2 comprises the sub-step of calculating an energy value for each of said forcing frequencies.

The step of detecting an external forcing applied to the intrusion-detection barrier 2 comprises the sub-step of comparing each energy value with the energy threshold value.

The method of detecting break-ins in the intrusion-detection barrier 2 comprises a third step of generating an alarm signal when an external forcing applied to the intrusion-detection barrier 2 is detected. The step of generating the alarm signal comprises the sub-step of generating the alarm signal when at least one energy value is greater than the energy threshold value.

According to a preferred arrangement, the step of detecting an external forcing applied to the intrusion-detection barrier 2 comprises the sub-step of calculating the number of occurrences of exceeding the energy threshold. In other words, the time trend of energy values is assessed.

This step of generating an alarm signal when an external forcing applied to the intrusion-detection barrier 2 is detected comprises the sub-step of selecting at least one threshold value for the number of occurrences, such threshold value for the number of occurrences preferably comprising a high-frequency value and a low-frequency value.

The step of generating an alarm signal when an external forcing applied to the intrusion-detection barrier 2 is detected comprises the sub-step of comparing the number of occurrences with the threshold value for the number of occurrences.

The step of generating an alarm signal when an external forcing applied to the intrusion-detection barrier 2 is detected comprises the sub-step of generating the alarm signal when the value of the number of occurrences exceeds the threshold value for the number of occurrences. In other words, the alarm signal is generated when the detected forcing frequencies generate a significant energy value, i.e. greater than a predetermined energy threshold value. Such energy assessment is accompanied by an assessment of the occurrences. This means that the alarm signal is generated by the sensor 3 when the aforementioned energy threshold is exceeded for a number of times greater than the threshold value for the number of occurrences.

It shall be noted that the method of detecting break-ins as described above can also generate a tamper signal when the system 1 detects that the orientation of the sensor 3 in space has changed and/or one portion of the intrusion-detection barrier has been cut and/or one sensor 3 has been isolated from the rest of the array 4. The tamper signal is preferably different from the alarm signal. Nevertheless, in certain embodiments, the tamper signal and the alarm signal may be substantially the same.

Advantageously, the method of detecting break-ins as described above allow the recognition of mechanical actions associated with break-ins in the intrusion-detection barrier 2 with greater accuracy, effectiveness and stability as compared with prior art methods. This high performance is obtained because the method is able to discriminate the mechanical actions imparted to the intrusion-detection barrier 2 in association with harmless events from mechanical actions associated to actual break-ins.

Advantageously, the method of detecting break-ins classifies at least a portion of the intrusion-detection barrier 2 according to its rigidity. This allows the method to be easily adapted to the heterogeneity of intrusion-detection systems 1. Furthermore, the entire intrusion-detection barrier 2 may have a single uniform classification or have portions with different classes.

Advantageously, the method of detecting break-ins affords greater accuracy and efficiency in the detection of actual break-ins as compared with the methods of the prior art.

Advantageously, the method of detecting break-ins automatically detects the break-in, without requiring any action by the user except initial calibration of at least one sensor 3.

Advantageously, due to the operation of MEMS sensors 3 in the intrusion-detection system 1 the generated electrical signal is not affected by the noise of the array 4 of sensors 3. A better signal-to-noise ratio is thus obtained.

The invention claimed is:

1. A method of detecting break-ins in an intrusion-detection barrier which comprises an array of sensors in signal communication with one another and connected to a control unit, said method comprising:
    calibrating at least one sensor of the array of sensors;
    detecting an external forcing applied to the intrusion-detection barrier, said external forcing having oscillation-forcing frequencies; and
    generating an alarm signal when said external forcing is detected;
    wherein
    calibrating the at least one sensor comprises:
        applying mechanical stress to said intrusion-detection barrier to cause said intrusion-detection barrier to resonate at its characteristic frequencies;
        creating a digital filter for said at least one sensor configured to identify said characteristic frequencies;
    detecting an external forcing applied to the intrusion-detection barrier comprises:
        applying said digital filter to identify the oscillation-forcing frequencies applied to the intrusion-detection barrier, and discriminating said oscillation-forcing frequencies from the characteristic frequencies of the intrusion-detection barrier;
        selecting at least one energy threshold value;
        calculating an energy value for each of said oscillation-forcing frequencies; and
        comparing each energy value with the at least one energy threshold value; and
    generating said alarm signal comprises generating the alarm signal when at least one energy value is greater than the at least one energy threshold value.

2. The method as claimed in claim 1, wherein calibrating the at least one sensor further comprises calibrating each sensor, and
    wherein detecting the external forcing applied to the intrusion-detection barrier and generating the alarm signal are carried out using each sensor individually and independently of the array of sensors.

3. The method as claimed in claim 1, wherein applying mechanical stress to said intrusion-detection barrier comprises applying stress to said intrusion-detection barrier proximate to said at least one sensor.

4. The method as claimed in claim 1, wherein creating the digital filter comprises selecting the characteristic frequencies of said intrusion-detection barrier and classifying said intrusion-detection barrier as rigid or semirigid fencing according to the selected characteristic frequencies.

5. The method as claimed in claim 1, wherein calibrating further comprises calculating a Fast Fourier Transform to identify the characteristic frequencies of said intrusion-detection barrier.

6. The method as claimed in claim 1, wherein detecting the external forcing applied to the intrusion-detection barrier further comprises calculating a Fast Fourier Transform for each external forcing.

7. The method as claimed in claim 1, wherein said at least one energy threshold value comprises at least one high-frequency energy threshold value and at least one low-frequency energy threshold value.

8. The method as claimed in claim 1, wherein
    detecting the external forcing applied to the intrusion-detection barrier further comprises:
        calculating a number of occurrences of exceeding the at least one energy threshold value; and
    generating the alarm signal further comprises:
        selecting at least one threshold value for the number of occurrences;
        comparing the number of occurrences with the at least one threshold value for the number of occurrences; and
        generating the alarm signal when the value of the number of occurrences exceeds the at least one threshold value for the number of occurrences.

9. The method as claimed in claim 8, wherein said at least one threshold value for the number of occurrences comprises at least one high-frequency occurrence threshold value and at least one low-frequency occurrence threshold value.

10. A system for carrying out the method as claimed in claim 1, the system comprising:
   at least one array of sensors in signal communication with one another, at least some of which are located along the intrusion-detection barrier;
   a control unit in signal communication with said sensors; and
   a network card in signal communication with said control unit.

11. A method of detecting break-ins in an intrusion-detection barrier which comprises an array of sensors in signal communication with one another and connected to a control unit, the method comprising:
   calibrating at least one of the sensors of the array, the calibrating comprising:
      applying mechanical stress to the intrusion-detection barrier to cause the intrusion-detection barrier to resonate at characteristic frequencies; and
      creating a digital filter, for the at least one of the sensors, configured to identify the characteristic frequencies;
   detecting external forcing applied to the intrusion-detection barrier, the external forcing having oscillation-forcing frequencies, the detecting comprising:
      applying the digital filter to identify the oscillation-forcing frequencies applied to the intrusion-detection barrier, and discriminating the oscillation-forcing frequencies from the characteristic frequencies of the intrusion-detection barrier;
      selecting at least one energy threshold value;
      calculating an energy value for each of the oscillation-forcing frequencies; and
      comparing each of the energy values with the at least one energy threshold value; and
   generating an alarm signal when at least one of the energy values is greater than the at least one energy threshold value.

12. The method of claim 11, wherein the calibrating of the at least one of the sensors of the array further comprises calibrating each of the sensors of the array,
   wherein the detecting of the external forcing applied to the intrusion-detection barrier is carried out using each of the sensors individually and independently of the array of sensors, and
   wherein the generating of the alarm signal is carried out using each of the sensors individually and independently of the array of sensors.

13. The method of claim 11, wherein the applying of the mechanical stress to the intrusion-detection barrier comprises applying stress to the intrusion-detection barrier proximate to the at least one of the sensors of the array.

14. The method of claim 11, wherein the creating of the digital filter comprises:
   selecting the characteristic frequencies of the intrusion-detection barrier; and
   classifying the intrusion-detection barrier as rigid or semi-rigid fencing according to the selected characteristic frequencies.

15. The method of claim 11, wherein the calibrating of the at least one of the sensors of the array further comprises calculating a Fast Fourier Transform to identify the characteristic frequencies of the intrusion-detection barrier.

16. The method of claim 11, wherein the detecting of the external forcing applied to the intrusion-detection barrier further comprises calculating a Fast Fourier Transform for each external forcing.

17. The method of claim 11, wherein the at least one energy threshold value comprises at least one high-frequency energy threshold value and at least one low-frequency energy threshold value.

18. The method of claim 11, wherein the detecting of the external forcing applied to the intrusion-detection barrier further comprises:
   calculating a number of occurrences of exceeding the at least one energy threshold value; and
   wherein the generating of the alarm signal comprises:
      selecting at least one threshold value for the number of occurrences;
      comparing the number of occurrences with the at least one threshold value for the number of occurrences; and
      generating the alarm signal when a value of the number of occurrences exceeds the at least one threshold value for the number of occurrences.

19. The method of claim 18, wherein the at least one threshold value for the number of occurrences comprises at least one high-frequency occurrence threshold value and at least one low-frequency occurrence threshold value.

20. A system for carrying out the method of claim 11, the system comprising:
   the array of sensors in signal communication with one another;
   the control unit in signal communication with the array of sensors; and
   a network card in signal communication with the control unit;
   wherein at least some of the sensors are located along the intrusion-detection barrier.

* * * * *